United States Patent
Gibson et al.

(10) Patent No.: US 9,940,384 B2
(45) Date of Patent: Apr. 10, 2018

(54) STATISTICAL CLUSTERING INFERRED FROM NATURAL LANGUAGE TO DRIVE RELEVANT ANALYSIS AND CONVERSATION WITH USERS

(71) Applicant: International Business Machines Corporation, Armonk, NY (US)

(72) Inventors: Stephen D. Gibson, Kemptville (CA); Alireza Pourshahid, Ottawa (CA); Vinay N. Wadhwa, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/969,211

(22) Filed: Dec. 15, 2015

(65) Prior Publication Data
US 2017/0169094 A1    Jun. 15, 2017

(51) Int. Cl.
*G06F 17/30* (2006.01)
*G06F 17/28* (2006.01)
*G06N 5/04* (2006.01)

(52) U.S. Cl.
CPC ........ *G06F 17/30598* (2013.01); *G06F 17/28* (2013.01); *G06N 5/04* (2013.01)

(58) Field of Classification Search
CPC ...... G06F 17/30598; G06F 17/28; G06N 5/04
USPC ....................................................... 707/737
See application file for complete search history.

(56) References Cited

U.S. PATENT DOCUMENTS

| | | | |
|---|---|---|---|
| 6,766,320 B1 | 7/2004 | Wang et al. | |
| 8,024,332 B2 | 9/2011 | Cao et al. | |
| 8,204,751 B1 | 6/2012 | Di Fabbrizio et al. | |
| 8,594,996 B2 | 11/2013 | Liang et al. | |
| 8,676,586 B2 * | 3/2014 | Wasserblat | H04M 3/5232 |
| | | | 704/270 |
| 8,788,517 B2 | 7/2014 | Horvitz et al. | |
| 8,903,711 B2 * | 12/2014 | Lundberg | G06F 17/28 |
| | | | 704/8 |

(Continued)

OTHER PUBLICATIONS

Ittycheriah, Abraham, et al., "IBM's Statistical Question Answering System—TREC-11", The Eleventh Text REtrieval Conference (TREC-11), NIST, Gaithersburg, MD, Nov. 19-22, 2002, 8 pages.*

(Continued)

*Primary Examiner* — Robert Stevens
(74) *Attorney, Agent, or Firm* — Stephan R. Tkacs; Stephen J. Walder, Jr.; Ryan Lewis

(57) ABSTRACT

A mechanism is provided in a data processing system for statistical clustering inferred from natural language to drive relevant analysis. The mechanism receives a natural language text from a user and processes the natural language text to identify an entity of interest and a focus of statistical analysis. The mechanism performs a follow-up question and answer conversation with the user to receiving from the user one or more driving factor values for the one or more driving factors. The mechanism determines at least one cluster of entities matching the one or more driving factor values and generates at least one data visualization of the data in the corpus for the focus of statistical analysis having a scope that is narrowed based on the at least one cluster of entities matching the one or more driving factor values.

20 Claims, 2 Drawing Sheets

(56) References Cited

U.S. PATENT DOCUMENTS

| | | | |
|---|---|---|---|
| 2008/0221892 A1* | 9/2008 | Nathan | G06F 17/279 704/257 |
| 2009/0150388 A1 | 6/2009 | Roseman et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0117005 A1 | 5/2012 | Spivack | |
| 2012/0260263 A1* | 10/2012 | Edoja | G06Q 30/02 719/313 |
| 2012/0303559 A1* | 11/2012 | Dolan | G06N 99/005 706/12 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0072948 A1 | 3/2014 | Boguraev et al. | |
| 2014/0272885 A1* | 9/2014 | Allen | G09B 7/02 434/322 |
| 2014/0278362 A1* | 9/2014 | Gerken, III | G06F 17/278 704/9 |
| 2015/0039536 A1 | 2/2015 | Cook et al. | |
| 2015/0186784 A1 | 7/2015 | Barborak et al. | |
| 2016/0132198 A1* | 5/2016 | Sinclair | G06F 3/0482 715/739 |
| 2016/0232221 A1* | 8/2016 | McCloskey | G06F 17/30598 |

OTHER PUBLICATIONS

Tang, Min, et al., "Active Learning for Statistical Natural Language Parsing", ACL '02, Philadelphia, PA, Jul. 2002, pp. 120-127.*

Lita, Lucian Vlad, et al., "Instance-Based Question Answering: A Data Driven Approach", Carnegie Mellon Univ. Research Showcase @ CMU, Institute for Software Research, School of Computer Science, Pittsburgh, PA, © 2004, 9 pages.*

Kwok, Cody, et al., "Scaling Question Answering to the Web", ACM Transactions on Information Systems, vol. 19, No. 3, Jul. 2001, pp. 242-262.*

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

STATISTICAL CLUSTERING INFERRED FROM NATURAL LANGUAGE TO DRIVE RELEVANT ANALYSIS AND CONVERSATION WITH USERS

BACKGROUND

The present application relates generally to an improved data processing apparatus and method and more specifically to mechanisms for statistical clustering inferred from natural language to drive relevant analysis and conversation with users.

Analytics is the discovery and communication of meaningful patterns in data. Especially valuable in areas rich with recorded information, analytics relies on the simultaneous application of statistics, computer programming, and operations research to quantify performance. Analytics often favors data visualization to communicate insight. Companies commonly apply analytics to business data to describe, predict, and improve business performance. Specifically, areas within analytics include predictive analytics, enterprise decision management, retail analytics, store assortment and stock-keeping unit optimization, marketing optimization and marketing mix modeling, web analytics, sales force sizing and optimization, price and promotion modeling, predictive science, credit risk analysis, and fraud analytics. Since analytics can require extensive computation (see big data), the algorithms and software used for analytics harness the most current methods in computer science, statistics, and mathematics.

Natural language processing (NLP) is a field of computer science, artificial intelligence, and computational linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation.

SUMMARY

In one illustrative embodiment, a method, in a data processing system, is provided for statistical clustering inferred from natural language to drive relevant analysis. The method comprises receiving a natural language text from a user and processing the natural language text to identify an entity of interest and a focus of statistical analysis. The method further comprises performing a follow-up question and answer conversation with the user to receive from the user one or more driving factor values for the one or more driving factors. The method further comprises determining at least one cluster of entities matching the one or more driving factor values and generating at least one data visualization of the data in the corpus for the focus of statistical analysis having a scope that is narrowed based on the at least one cluster of entities matching the one or more driving factor values.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
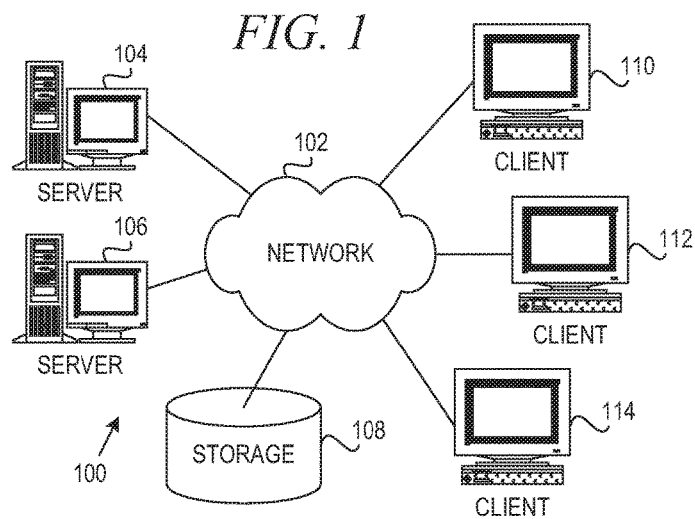
FIG. 1 is an example diagram of a distributed data processing system in which aspects of the illustrative embodiments may be implemented.

The illustrative embodiments provide mechanisms for using natural language (NL) processing to identify the important entity (concept or object) of interest for a question being asked by a user. The mechanisms then use that entity plus a prediction algorithm to detect the driving factors that are important to be able to answer the question. The driving factors are the attributes that are relevant to the clustering of the important entities or attributes in the question. Thereafter, the mechanisms use NL, processing to ask relevant clarifying questions from the users and find the attributes that are important to allow the system to answer the user's question.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
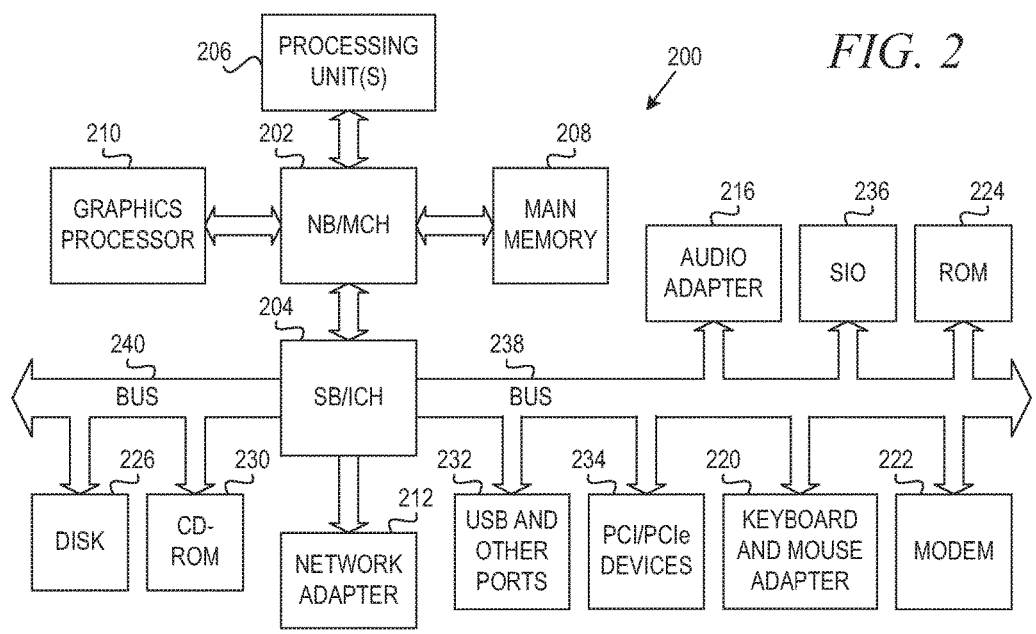
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a system for performing statistical clustering inferred from natural language to drive relevant analysis and conversation with users. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates natural language processing, clustering, question and answer conversation with users, analytics, and data visualization to effect statistical clustering inferred from natural language to drive relevant analysis and conversation.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SBACH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to natural language processing, clustering, question and answer conversation with users, analytics, and data visualization to effect statistical clustering inferred from natural language to drive relevant analysis and conversation.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may he applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
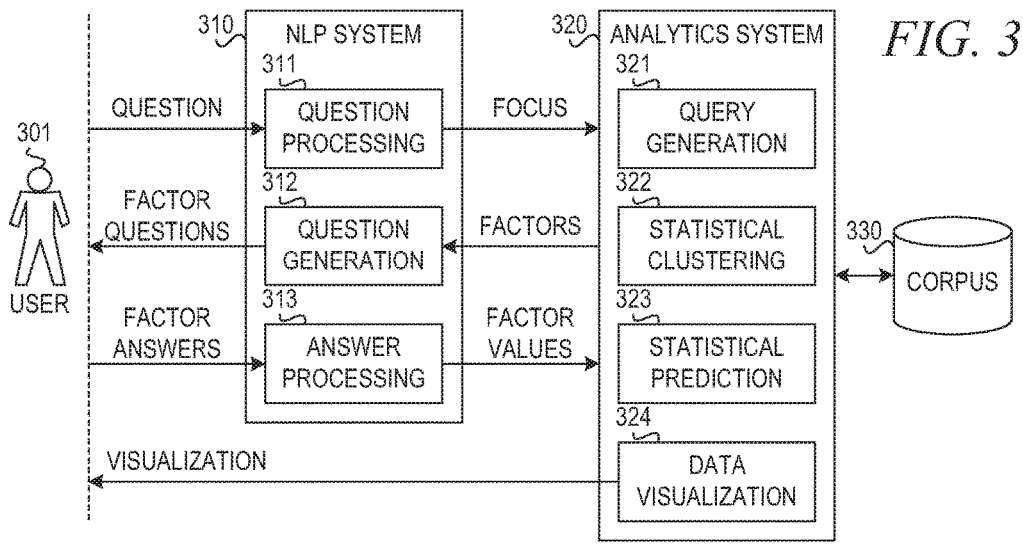
FIG. 3 is a block diagram illustrating a system for statistical clustering inferred from natural language to drive relevant analysis and conversation in accordance with an illustrative embodiment.

FIG. 3 is a block diagram illustrating a system for statistical clustering inferred from natural language to drive relevant analysis and conversation in accordance with an illustrative embodiment. A user 301 submits a question to natural language processing (NLP) system 310 about an entity (concept or object) of interest to be compared to data from corpus 330 and a focus of the data being analyzed. The following are example questions that user 301 may ask:

How does my company's sales in product A compare to companies that are similar to my company?

Do I sleep better than people like me?

Prior art systems, although very smart, are not able to answer questions similar to the above questions because they do not have the information required to perform this analysis. Mainly, prior art systems do not know much about the attributes of objects of interest with respect to the focus of the analysis.

Collecting this information in question-and-answer form or a simple user interface could be cumbersome and time consuming for the user. In addition, the system may collect data points that do not help the analysis and may also perform brute force type clustering and analysis that is not necessary. The illustrative embodiments allow NLP systems to collect the information that matters to give users relevant and more accurate responses.

As will be discussed in greater detail hereafter, the illustrative embodiments are integrated in, augment, and extend the functionality of these NL mechanisms with regard to driving relevant analysis and conversation with users. Thus, it is important to first have an understanding of how natural language processing in NLP system 310 is implemented before describing how the mechanisms of the illustrative embodiments are integrated in and augment such NLP systems.

One example of NL processing is question/answer generation which is described in U.S. Patent Application Publication No. 2011/0125734, which is herein incorporated by reference in its entirety. NLP system 310 analyzes natural language to generate solutions not possible with traditional deterministic systems. In some embodiments, NLP system 310 is a probabilistic system built on concepts of Artificial Intelligence such as natural language processing, information retrieval, knowledge representation, automated reasoning, and machine learning.

The NLP system 310 is implemented on one or more computing devices, such as server 104 in FIG. 1 (comprising one or more processors and one or more memories, and potentially any other computing device elements generally known in the art including buses, storage devices, communication interfaces, and the like) connected to a computer network 102. The NLP system 310 includes question processing component 311, question generation component 312, and answer processing component 313. Other embodiments of the NLP system 310 may be used with components, systems, sub-systems, and/or devices other than those that are depicted herein.

In on embodiment, NLP system 310 is configured to implement an NLP system pipeline (not shown), which comprises a plurality of stages for processing questions and answers and for generating questions. The NLP system pipeline includes a plurality of software components that are specialized for particular functions, such as labeling parts of speech, identifying sentence structure, identifying entities and entity types (e.g., person, place, date, animal, etc.), and the like. These software components are also referred to as reasoning algorithms. In some embodiments, the software components are configured in various combinations to perform different functions.

In some illustrative embodiments, the NLP system 310 may be the IBM Watson™ Analytics system available from International Business Machines Corporation of Armonk, N.Y., which is augmented with the mechanisms of the illustrative embodiments described hereafter. More particularly, the IBM Watson™ Analytics system offers the benefits of advanced analytics without the complexity. The IBM Watson™ Analytics smart data discovery service available on the cloud guides data exploration, automates predictive analytics and enables effortless dashboard and infographic creation provides cognitive services for processing unstructured content for understanding and analysis.

Imagine a scenario that the user 301 is performing analysis on a data set in corpus 330 that has demographic information about individuals including education, home town, gender, age, salaty, family status, and hours per day they spend working, having fun, sleeping, taking care of children, etc. When user 301 asks the system, "Do I sleep better than people like me?" question processing component 311 of NLP system 310 detects that the entity of interest is the user and the focus of analysis in this question is "sleep." The system does not know much about the user; therefore, comparing the user 301 with others who are like him or her is an impossible task.

One approach to solve this problem may be to collect all information that exists in the data set from the user, which could be 20 to 50 attributes in a typical data set. This approach is not practical or efficient for the user 301 or NLP system 310.

In accordance with an illustrative embodiment, question processing component 311 parses the question to detect the focus of the question and communicates the focus to analytics system 320. The focus of the question may include the entity of interest and the focus of the analysis. The analytics system 320 includes query generation component 321, statistical clustering component 322, and results visualization component 323. Query generation component 321 generates queries for statistical data in corpus 330. Statistical clustering component 322 performs clustering on data received from corpus 330 based on the focus of the analysis. Cluster analysis or clustering is the task of grouping a set of objects in such a way that objects in the same group (called a cluster) are more similar (in some sense or another) to each other than to those in other groups (clusters). It is a main task of exploratory data mining, and a common technique for statistical data analysis, used in many fields.

Statistical prediction component 323 detects the most important driving factors for the focus of analysis based on the clustering of data. For the example question, "Do I sleep better than people like me?" statistical prediction component 323 may determine that the driving factors for sleep are age and salary. Analytics system 320 communicates the determined driving factors to NLP system 310.

Question generation component 312 generates follow-up questions to be presented to the user 301 to gather information required about the entity of interest. For the above example question, the follow-up questions may include "How old are you?" "What is your yearly salary?" and "How long do you sleep per day?" Question generation component 312 may use slot filler templates to generate the follow-up questions. The user 301 provides answers to the questions to NLP system 310. Answer processing component 313 parses the answers to determine the values for the attributes that form the driving factors.

NLP system 310 then communicates the factor values to analytics system 320. Statistical clustering component 322 then creates clusters based on the driving factors. Based on the information collected from the user 301, analytics system 320 matches the entity of interest to one of the clusters. For the above question, the entity of interest is the user 301; therefore, analytics system 320 places the user 301 in a cluster of people who are like the user 301 from the point of view of the driving factors for sleep.

Using the matching cluster, analytics system 320 gathers data form corpus 330. Data visualization component 324 generates and presents data visualizations of the data to user 301. These data visualizations present data from attributes of the question but narrow the scope of the data to the responses to the follow-up questions. In other words, data visualization component 324 narrows the resulting visualization over the structured data to the results of the question. This is the useful outcome in the case of structured data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
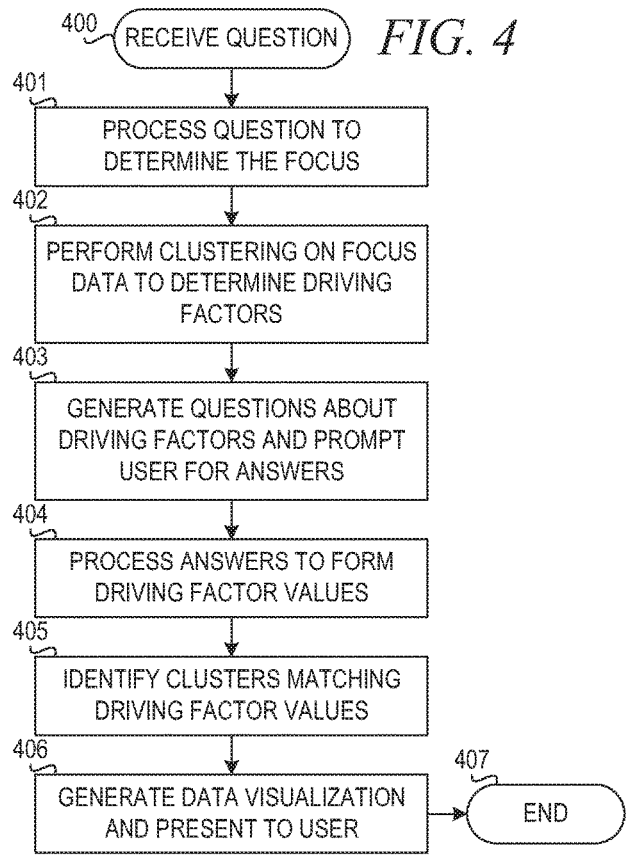
FIG. 4 is a flowchart illustrating operation of a system for statistical clustering inferred from natural language to drive relevant analysis and conversation with users in accordance with an illustrative embodiment.

FIG. 4 is a flowchart illustrating operation of a system for statistical clustering inferred from natural language to drive relevant analysis and conversation with users in accordance with an illustrative embodiment. Operation begins with receiving a question text from the user (block 400). In accordance with the illustrative embodiment, the question asks about an entity (concept or object) of interest with respect to a focus of statistical analysis. The system processes the question to determine the focus of the question (block 401). The system processes the question using natural language processing (NLP) techniques including deep parsing, lexical analysis, and the like. The focus may include the entity of interest and the focus of statistical analysis.

The system performs clustering on the focus of data to determine driving factors for the focus of the statistical analysis (block 402). The system may determine the driving factors using statistical prediction techniques of an analytics system. The system then generates follow-up questions about the driving factors and prompts the user for answers (block 403). The system processes the answers using NLP techniques to form driving factor values (block 404).

The system performs clustering and identifies a cluster matching the driving factor values (block 405). Then, the system generates data visualizations and presents the data visualizations to the user (block 406). Thereafter, operation ends (block 407).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable fir storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for statistical clustering inferred from natural language to drive relevant analysis, the method comprising:
   receiving a natural language text from a user;
   processing the natural language text to identify an entity of interest and a focus of statistical analysis;
   performing a follow-up question and answer conversation with the user to receive from the user one or more driving factor values for one or more driving factors for the focus of the statistical analysis;
   determining at least one cluster of entities matching the one or more driving factor values; and
   generating at least one data visualization of the data in a corpus for the focus of statistical analysis having a scope that is narrowed based on the at least one cluster of entities matching the one or more driving factor values.

2. The method of claim 1, wherein performing a follow-up question and answer conversation comprises performing a clustering operation on data in the corpus for the focus of statistical analysis and determining one or more driving factors for the focus of the statistical analysis based on results of the clustering operation.

3. The method of claim 2, wherein performing a follow-up question and answer conversation comprises detecting the most important driving factors for the focus of analysis based on the results of the clustering operation.

4. The method of claim 1, wherein performing a follow-up question and answer conversation comprises generating one or more follow-up questions to be presented to the user to gather information required about the entity of interest and receiving responses to the one or more questions from the user.

5. The method of claim 4, wherein performing a follow-up question and answer conversation further comprises parsing the responses to determine values for attributes that form the driving factors.

6. The method of claim 4, wherein generating one or more follow-up questions comprises using slot tiller templates to generate the follow-up questions.

7. The method of claim 1, wherein determining at least one cluster of entities matching the one or more driving factor values comprises creating clusters based on the driving factors and matching the entity of interest to at least one of the clusters.

8. A computer program product comprising a computer readable storage medium having a computer readable program stored therein, wherein the computer readable program, when executed on a computing device, causes the computing device to:
   receive a natural language text from a user;
   process the natural language text to identify an entity of interest and a focus of statistical analysis;
   perform a follow-up question and answer conversation with the user to receive from the user one or more driving factor values for one or more driving factors for the focus of the statistical analysis;
   determine at least one cluster of entities matching the one or more driving factor values; and
   generate at least one data visualization of the data in a corpus for the focus of statistical analysis having a scope that is narrowed based on the at least one cluster of entities matching the one or more driving factor values.

9. The computer program product of claim 8, wherein performing a follow-up question and answer conversation comprises performing a clustering operation on data in the corpus for the focus of statistical analysis and determining one or more driving factors for the focus of the statistical analysis based on results of the clustering operation.

10. The computer program product of claim 9, wherein performing a follow-up question and answer conversation comprises detecting the most important driving factors for the focus of analysis based on the results of the clustering operation.

11. The computer program product of claim 8, wherein performing a follow-up question and answer conversation comprises generating one or more follow-up questions to be presented to the user to gather information required about the entity of interest and receiving responses to the one or more questions from the user.

12. The computer program product of claim 11, wherein performing a follow-up question and answer conversation further comprises parsing the responses to determine values for attributes that form the driving factors.

13. The computer program product of claim 11, wherein generating one or more follow-up questions comprises using slot filler templates to generate the follow-up questions.

14. The computer program product of claim 8, wherein determining at least one cluster of entities matching the one or more driving factor values comprises creating clusters based on the driving factors and matching the entity of interest to at least one of the clusters.

15. An apparatus comprising:
    a processor; and
    a memory coupled to the processor, wherein the memory comprises instructions which, When executed by the processor, cause the processor to:
    receive a natural language text from a user;
    process the natural language text to identify an entity of interest and a focus of statistical analysis;
    perform a follow-up question and answer conversation with the user to receive from the user one or more driving factor values for one or more driving factors for the focus of the statistical analysis;
    determine at least one cluster of entities matching the one or more driving factor values; and
    generate at least one data visualization of the data in a corpus for the focus of statistical analysis having a scope that is narrowed based on the at least one cluster of entities matching the one or more driving factor values.

16. The apparatus of claim 15, wherein performing a follow-up question and answer conversation comprises performing a clustering operation on data in the corpus for the focus of statistical analysis and determining one or more driving factors for the focus of the statistical analysis based on results of the clustering operation.

17. The apparatus of claim 16, wherein performing a follow-up question and answer conversation comprises detecting the most important driving factors for the focus of analysis based on the results of the clustering operation.

18. The apparatus of claim 15, wherein performing a follow-up question and answer conversation comprises generating one or more follow-up questions to be presented to the user to gather information required about the entity of interest and receiving responses to the one or more questions from the user.

19. The apparatus of claim 18, wherein performing a follow-up question and answer conversation further comprises parsing the responses to determine values for attributes that form the driving factors.

20. The apparatus of claim 15, wherein determining at least one cluster of entities matching the one or more driving factor values comprises creating clusters based on the driving factors and matching the entity of interest to at least one of the clusters.

\* \* \* \* \*